United States Patent
Pandharipande et al.

(10) Patent No.: US 9,857,458 B2
(45) Date of Patent: *Jan. 2, 2018

(54) CONTROLLING TRANSMISSION OF PULSES FROM A SENSOR

(71) Applicant: PHILIPS LIGHTING HOLDING B.V., Eindhoven (NL)

(72) Inventors: Ashish Vijay Pandharipande, Eindhoven (NL); David Ricardo Caicedo Fernandez, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/652,467

(22) PCT Filed: Dec. 4, 2013

(86) PCT No.: PCT/IB2013/060615
§ 371 (c)(1),
(2) Date: Jun. 16, 2015

(87) PCT Pub. No.: WO2014/097036
PCT Pub. Date: Jun. 26, 2014

(65) Prior Publication Data
US 2015/0331093 A1 Nov. 19, 2015

Related U.S. Application Data

(60) Provisional application No. 61/738,534, filed on Dec. 18, 2012.

(51) Int. Cl.
*G01S 15/00* (2006.01)
*G01S 7/524* (2006.01)
(Continued)

(52) U.S. Cl.
CPC .............. *G01S 7/524* (2013.01); *G01S 7/526* (2013.01); *G01S 15/04* (2013.01); *H05B 37/0227* (2013.01)

(58) Field of Classification Search
CPC combination set(s) only.
See application file for complete search history.

(56) References Cited

U.S. PATENT DOCUMENTS

| 4,974,072 A | 11/1990 | Hasegawa |
| 5,355,130 A * | 10/1994 | Luber ............... H03K 17/94 327/141 |

(Continued)

FOREIGN PATENT DOCUMENTS

| JP | 62140084 A | 6/1987 |
| JP | 6042981 A | 2/1994 |

(Continued)

OTHER PUBLICATIONS

Nissanks B. Priyantha et al, "The Cricket Location-Support System", Proceedings of the Annual International Conference on Mobile Computing and Networking (ACM MOBICOM) Aug. 6, 2000, XP-002181658.

(Continued)

*Primary Examiner* — Travis Hunnings (57) ABSTRACT

Apparatus for use in one of a plurality of sensors each having a respective transmitter which transmits pulses for sensing, a respective clock which controls timing of the pulses transmitted from the respective transmitter, and a respective receiver which receives echoed instances of the pulses. The apparatus comprises: sensing logic configured to sense a being or object in dependence on the echoed pulses received back by the respective receiver from the respective transmitter, and timing logic configured to compensate for a clock discrepancy between the respective clock and that of one or more others of the sensors. The timing logic does this (Continued)

by using the respective receiver to listen for instances of the pulses from the one or more other sensors, and adjusting the timing of the pulses from the respective transmitter based thereon.

15 Claims, 6 Drawing Sheets

(51) Int. Cl.
*G01S 7/526* (2006.01)
*G01S 15/04* (2006.01)
*H05B 37/02* (2006.01)

(56) References Cited

U.S. PATENT DOCUMENTS

| | | | |
|---|---|---|---|
| 6,307,811 | B1 | 10/2001 | Luber |
| 6,622,022 | B1 | 9/2003 | Du |
| 2004/0128091 | A1 | 7/2004 | Delin et al. |
| 2004/0240480 | A1 | 12/2004 | Hiben et al. |
| 2009/0081951 | A1 | 3/2009 | Erdmann et al. |
| 2011/0007672 | A1 | 1/2011 | Park et al. |
| 2011/0105904 | A1* | 5/2011 | Watanabe ............ A61B 8/00 600/443 |
| 2011/0133653 | A1 | 6/2011 | Hu et al. |
| 2015/0093990 | A1* | 4/2015 | Lin .................. H04W 4/008 455/41.2 |
| 2015/0338510 | A1* | 11/2015 | Pandharipande .. H05B 33/0815 367/93 |

FOREIGN PATENT DOCUMENTS

| | | |
|---|---|---|
| JP | 2004173174 A | 6/2004 |
| WO | WO2005062071 A1 | 7/2005 |
| WO | 2005074200 A1 | 8/2005 |
| WO | 2011151772 A1 | 12/2011 |

OTHER PUBLICATIONS

Chris Kreucher et al, "Adaptive Multi-modality Sensor Scheduling for Detection and Tracking of Smart Targets", The University of Michigan, Dept. of Electrical Eng., and Computer Science.
Andrea Prati et al, "An Integrated Multi-Modal Sensor Network for Video Surveillance", VSSN'05, Nov. 11, 2005, Singapore.
Wengdong, Xiao, "Multi-Step Adaptive Sensor Scheduling for Target Tracking in Wireless Sensor Networks", Acoustics, Speech and Signal Processing, 2006 ICASSP 2006 Proccedings, 2006 IEEE International Conference, http://ieeexplore.ieee.org/xpl/login.jsp?reload=true&tp=&arnumber=1661066 &url=http%3A%2F%2Fieeexplore.ieee.org%2Fiel5%2F11024%2F34760%2F01661066.pdf%3Farnumber%3D1661066.
"Smart Power Strips", http://www.txu.com/en/Business/esource-biz/buying-equipment/office-equipment/smart-power-strips.aspx.
Fan Zhang et al, "Distributed Active Sensor Scheduling for Target Tracking in Ultrasonic Sensor Networks", Mobile Netw Appl., DOI 10.1007/s11036-011-0311-9.

\* cited by examiner

CONTROLLING TRANSMISSION OF PULSES FROM A SENSOR

CROSS-REFERENCE TO PRIOR APPLICATIONS

This application is the U.S. National Phase application under 35 U.S.C. §371 of International Application No. PCT/IB2013/060615, filed on Dec 4, 2013, which claims the benefit of U.S. Provisional Patent Application No. 61/738,534, filed on Dec 18, 2012. These applications are hereby incorporated by reference herein.

FIELD OF THE INVENTION

The present invention relates to controlling the transmission of pulses from a sensor for use amongst a plurality of sensors.

BACKGROUND

A presence sensor is a sensor for remotely sensing the presence of a being or other object, typically a person. For example the sensing of presence may comprise detecting whether or not the being or object is in motion, determining a measure of its motion (e.g. speed or velocity), determining its range from the sensor, and/or simply detecting the fact of its existence in a certain zone (e.g. defined by the range of the sensor).

Presence sensors come in two kinds: active or passive. An active presence sensor is one which transmits a probing waveform and then uses a reflection of that waveform received back at the sensor to detect presence, e.g. using certain signal characteristics in the reflected signal to determine presence-related information. Examples of active sensors include ultrasonic, radio (e.g. radar) and microwave sensors which emit pulses of ultrasonic, radio frequency (RF) or microwave radiation respectively and sense presence based on the reflection thereof. A passive presence sensor on the other hand does not transmit its own waveform but instead relies on radiation emitted by the being or object to be sensed, or reflected from it but originating from another source other than the sensor itself. Examples of passive sensors include infrared sensors which sense the infrared radiation given off by an object such as a person or other being, and light sensors which detect light reflected from the being or object being sensed (e.g. originating from the sun or electric lighting in a room).

Presence sensors have a wide range of applications. One such application is found in controlling a lighting system. For example office lighting typically constitutes almost 30% of the electrical consumption in office buildings. It is known that light control strategies based on occupant presence information can be the most effective in reducing energy consumption. Hence the design of green buildings typically involves presence-adaptive lighting control systems.

Active sensors like ultrasound sensors tend to provide better detection than passive infrared sensors in large volumetric spaces. In larger physical areas, it is commonplace to have multiple active presence sensors for proper detection coverage. When such presence sensing systems are deployed however, there is a potential for cross-interference across active transmissions. For the system as a whole to function properly, ideally each individual presence sensor should be able to determine presence-related information in its respective coverage area. Cross-interference across active sensors (e.g. ultrasound or RF) is a commonly encountered problem in indoor and outdoor sensing applications, which can affect proper operation of the sensing and control systems. For instance, a sensor may trigger a false alarm when an adjacent zone is occupied based on an overheard transmission from a neighboring sensor. Such sensing malfunction can disrupt the lighting control system as a whole.

Active presence sensors may also be found in other applications where the problem cross-interference may occur, or more generally where operation of one active sensor may affect one or more other sensors.

The problem of cross-interference management in ultrasonic sensor networks has been considered for example in "The Cricket Location-Support system". N. B. Priyantha, A. Chakraborty and H. Balakrishnan, Annual Conference on Mobile computing and Networking, 2000.

SUMMARY

It would be desirable to avoid potential cross-interference between active transmissions from different presence sensors, so that the system as a whole can function properly with each individual presence sensor being able to determine presence-related information in its respective coverage area. In one example, a time-division multiplexed protocol may be employed so that the sensors each transmit in a unique time slot. However, due to inherently unreliable clocks, sensors may drift from their assigned time slots over time. This can result in cross-interference, and thereby unreliable detection. Hence one objective that may be addressed by embodiments of the present invention is to provide a method for clock synchronization so that the time slots remain coordinated, ensuring proper sensor system performance. More generally it may be desirable to control the transmission of pulses from one sensor in relation to one or more other sensors, whether to mitigate any interference or other undesired effect that may occur between sensors, or to obtain any desired effect that may be achieved through their synchronized operation.

According to one aspect of the disclosure herein, there is provided apparatus for use in one of a plurality of sensors each having a respective transmitter which transmits pulses for sensing, a respective clock which controls timing of the pulses transmitted from the respective transmitter, and a respective receiver which receives echoed instances of said pulses. The apparatus comprises sensing logic configured to sense a being or object in dependence on the echoed pulses received back by the respective receiver from the respective transmitter. The apparatus also comprises timing logic configured to compensate for a clock discrepancy between the respective clock and that of one or more others of the sensors. The timing logic does this by using the respective receiver to listen for instances of the pulses from the one or more other sensors, and adjusting the timing of the pulses from the respective transmitter based thereon.

According to another aspect, there is provided computer program product for operating one of a plurality of sensors, the computer program product comprising code embodied on a computer-readable storage medium and configured so as when executed on a processing apparatus of the sensor to perform operations of the sensing logic and timing logic above.

According to another aspect, there may be provided apparatus for use in one of a plurality of ultrasonic sensors each comprising a respective ultrasound transmitter which transmits ultrasound pulses for sensing and a respective ultrasound receiver which receives echoed instances of said ultrasound pulses. This apparatus may comprise: sensing logic configured to sense a being or object in dependence on the echoed ultrasound pulses received back by the respective receiver from the respective transmitter; and synchronization logic configured to synchronize the ultrasound pulses transmitted from the respective transmitter relative to transmission of the ultrasound pulses from one or more others of said ultrasound sensors. The synchronization logic may use the respective receiver to listen for instances of the ultrasound pulses from the other ultrasound sensors and perform the synchronization based thereon.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of embodiments of the present invention and to show how they may be put into effect, reference is made by way of example to the accompanying drawings in which.

DETAILED DESCRIPTION OF PREFERRED EMBODIMENTS

Rather than relying on a central controller or single central element, it may be desirable to tend towards some of all of the intelligence involved in a lighting system to be embedded across the system, with functions like sensing being distributed amongst individual units. In the following embodiments of the present invention, there is provided a distributed active sensing system (e.g., based on ultrasonic sensor modality) for indoor presence detection that incurs little or no commissioning overhead in its installation, e.g. as part of a lighting system. One of the challenges in active presence sensor systems is potential cross-interference. Towards this end, a time-division multiplexed transmission protocol may be employed. However, due to the clock drifts inherent in the sensor, the sensor may drift from its assigned time slot. The following presents exemplary methods to ensure slot synchronization.

In embodiments the system described herein may be completely distributed and requires no explicit communication across different sensors. The method ensures that transmissions from the different sensors remain coordinated, thereby ensuring reliable presence sensing in the system. Embodiments of the invention may be applied to various active modalities (e.g. ultrasound, RF) of presence sensors that find applications in indoor and outdoor lighting controls. The following is described with respect to an ultrasonic sensor, although the ideas may be applied to other sensor modalities such as RF and light, and multi-modal sensors as well as array sensors such as described in "Ultrasonic Array Sensor for Indoor Presence Detection", D Caicedo and A Pandharipande, European Signal Processing Conference 2012.

As mentioned, cross-interference across active sensors (ultrasound, RF) is a commonly encountered problem in indoor and outdoor sensing applications, which can affect proper operation of the sensing and control systems. For instance, a sensor may trigger and create a false alarm due to overhearing the transmission from a neighboring sensor. In embodiments, one aspect of limiting cross-interference is that each sensor obtains a unique time slot for transmission and remains in that time slot. However this is challenging due to the inherent drifts in one or more of the respective clocks used to time transmission from each of the sensors.

Embodiments of the present invention address the problem of clock synchronization in a completely distributed manner. This helps realize a system with no additional networking connectivity. The distributed aspect of the synchronization method, where no explicit communication is used, leads to a presence sensing system where no central coordinator or other communication means needs to be set thus supporting its use in a lighting system that needs no commissioning for the sensing function.

Figure 1:
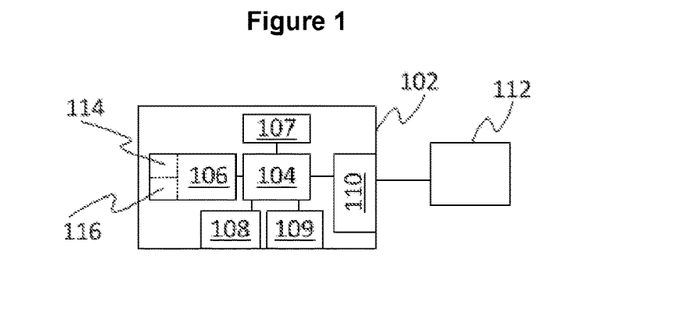
FIG. 1 is a schematic block diagram of a presence sensor.

FIG. 1 is a schematic block diagram illustrating an example presence sensor 102 according to embodiments of the present invention.

The sensor 102 comprises a wireless transmitter 108 and receiver 109, the transmitter 108 for transmitting a signal in the form of pulses of radiation for the purpose of sensing, and a receiver 109 for receiving a signal in the form of echoes of those pulses reflected back from beings or other objects within range of the receiver 109. For example the transmitter 108 may comprise an ultrasound transmitter for transmitting ultrasound pulses or an RF or microwave transmitter for transmitting RF or microwave pulses, and the receiver 109 may comprise an ultrasound, RF or microwave receiver respectively. In embodiments each receiver may comprise a receiver array having a plurality of receiver elements for performing sensing as outlined below.

The sensor 102 also comprises a clock 107, and port 110 for connecting to a part of a lighting system, e.g. to a lighting control element 112 of one or more luminaires. Further, the sensor 102 comprises apparatus for operating the sensor, comprising sensing logic 114 operatively coupled to the clock 107, transmitter 108, receiver 109 and port 110; and timing logic 116 operatively coupled to the clock 107, transmitter 108 and receiver 109. The sensing logic 114 is configured to process the pulses received from the receiver 109 in relation to the pulses transmitted from the transmitter 108, to thereby sense presence-related information in dependence on a reflection (echo) of the pulses, e.g. in the manner described below. The timing logic 116 is configured to controlling the timing of the pulses transmitted from the transmitter 108 under the influence of the clock 107, e.g. again in the manner described below.

In embodiments, the sensor 102 comprises processing apparatus in the form of a processor 104 or "CPU" (central processing unit) having one or more execution units, and storage in the form of a memory 106 comprising one or more storage media such as a magnetic storage medium (e.g. hard drive) and/or electronic storage medium (e.g. "flash" memory or other EEPROM). Each of the sensing logic 114 and/or timing logic 116 may be implemented as modules of code stored in the memory 106 and arranged to be executed on the processor 104. Alternatively each of the sensing logic 114 and/or timing logic 116 may be implemented wholly or partially in dedicated hardware circuitry, or configurable circuitry such as an FPGA (field programmable gate array).

Figure 2A:
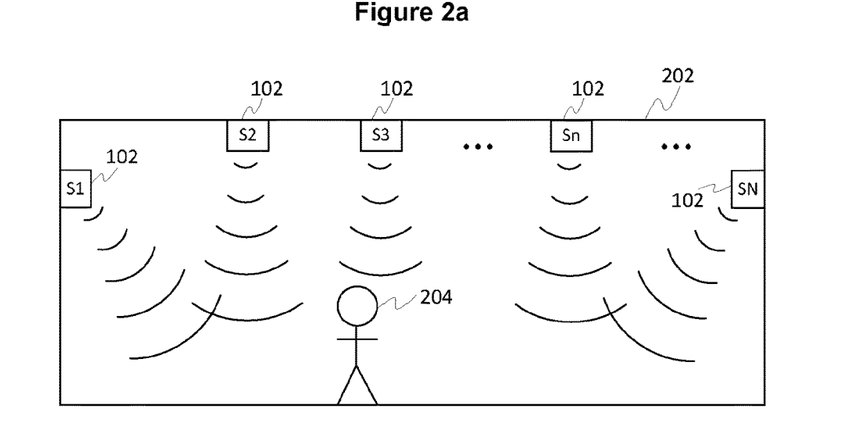
FIG. 2a is a schematic illustration of a distributed system of presence sensors.
Figure 2B:
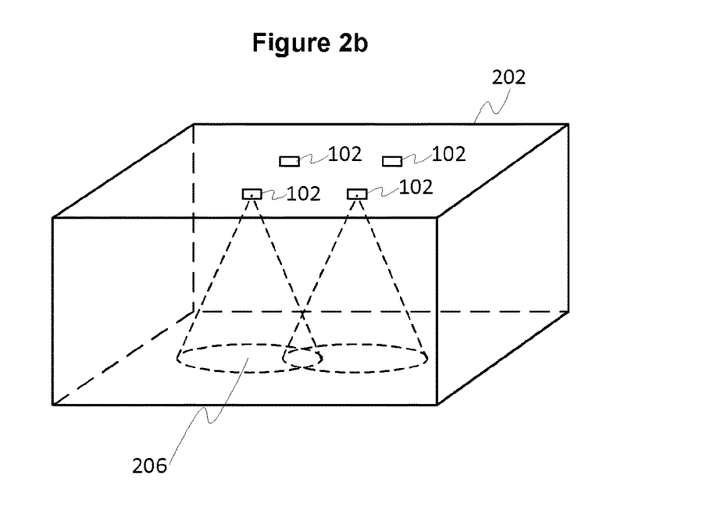
FIG. 2b is another schematic illustration of a distributed system of presence sensors.

FIGS. 2a and 2b provide schematic illustrations of an example sensing system comprising a plurality of sensors 102. Each of the sensors 102 is located at a different point and/or directed in a different respective direction, e.g. each sensor 102 may be mounted at a different spot on the walls and/or ceiling of a room 202. For illustrative purposes the different sensors 102 are numbered here 1 . . . N and labeled as sensors S1 . . . . SN.

Each sensor 102 comprises a respective instance of the clock 107, transmitter 108, receiver 109, port 110 and apparatus comprising sensing logic 114 and timing logic 116 (e.g. implemented on a respective processor 104 and memory 106). In embodiments each sensor comprises a respective instance of substantially the same clock 107, sensing logic 114 and timing logic 116. The timing logic 116 in each sensor 102 may be configured to operate autonomously of the other sensors 102, but to operate according to the same set of rules as the timing logic 116 in each of the other sensors 102. The clock 107 in each sensor 102 may be substantially the same in that they oscillate with the same nominal clock frequency, but it will be appreciated that each clock 107 will typically have a different respective clock error in its frequency, e.g. due to age, temperature and/or manufacturing spread. This will cause a discrepancy in that, when used to clock the transmission of pulses from the different sensors 102, the relative timing of these transmissions will gradually drift apart over time.

The sensing logic 114 in each sensor 102 is arranged to sense presence-related information from a respective coverage region, e.g. corresponding to an area 206 on the floor or three dimensional volume. The coverage region may be defined by the range of the sensor 102, i.e. of its transmitter 108 and/or receiver 109. As shown in FIG. 2b, one or more of the sensors 102 may be within listening range of one or more others of the sensors 102 such that the coverage regions 206 overlap.

The presence-related information which the sensing logic 114 in each sensor 102 is configured to sense may for example comprise information as to whether an object is sensed to be moving, the range of an object, or simply the fact of whether an object or a particular object is detected to be found in a certain place. The sensing logic may be configured to sense an object 204 in the form of a living being, e.g. a person (human) or other living creature, or some other non-living article such as an animated manmade device, or any of these. The term "object" is not intended to be limiting. An example based on detecting on motion is described below, but examples of other active presence sensing techniques in themselves will be familiar to a person skilled in the art.

Sensing logic 114 may be connected via the port 110 to an element of a system such as a control element 112 of a lighting system, and arranged to provide it with an output signal indicative of the sensed presence (or lack thereof). The element 112 may be configured to control one or more luminaires in dependence on the output signal, e.g. to turn on lighting in a certain zone when presence is detected by a sensor 102 whose coverage region corresponds to that zone, or turn off the lighting in that zone when no presence is detected. In embodiments, each sensor 102 may be connected via its respective port 110 to a common lighting controller which controls a plurality of luminaires based on the output signals from the sensors 102, or alternatively each sensor 102 may connected via its respective port 110 to control its own respective individual luminaire.

Regardless of whether the lighting is controlled centrally or individual luminaires are controlled based on respective sensors 102, this does not necessarily imply that any central control of the sensing functionality is needed. In embodiments the timing logic is configured to operate without a dedicated timing signal being communicated between the sensors or from a central controller, by instead listening for instances of the pulses from the one or more other sensors, e.g. as will be described shortly. In exemplary embodiments the sensing function may be entirely distributed amongst the sensors 102 with no central controller being involved for that purpose at least. That is, each sensor 102 only receives as an input the reflections of the transmitted pulses via the receiver 109, and the port 110 is only for outputting the sensed presence related information to a control element for controlling another aspect of the system, e.g. controlling lighting. Control information need not pass in the other direction from controller to sensor 102.

FIGS. 3 to 10 provide a set of schematic timing diagrams illustrating operation of the sensors 102 in accordance with embodiments of the present invention.

In embodiments, each of the sensors is to transmit on a different respective time slot over a plurality of frames. Thus when transmitting, each of the transmitters transmits one or more of the pulses on its respective time slot per frame. Each sensor transmits on a respective time slot such that they do not interfere with each other. For example the transmitter 108 sends out a signal comprising a waveform such as that depicted in FIG. 3 over an area 206 defined by the directivity of the transmitter. The waveform comprises one or more sensing pulses per frame transmitted on the respective time slot in each frame. In the illustrated example the pulses are sinusoidal and two pulses are transmitted from each sensor per frame (but alternative waveforms such as those using rectangular pulses or a different number of pulses per frame may also be employed). At the corresponding receiver side, the received signals are processed in order to arrive at presence-related sensing information.

Figure 3:
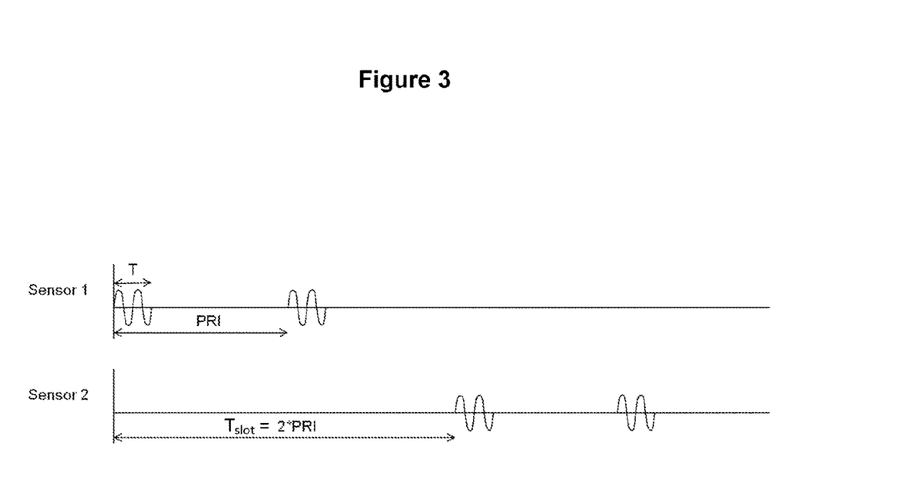
FIG. 3 is schematic timing diagram illustrating a multiplexed active transmission sensing protocol.

For example each presence sensor 102 may work as follows. The transmitter 108 sends out pulsed sinusoids of length T within a transmission slot of length $T_{slot}$, consisting of two transmission periods PRI (pulse repetition interval). At the corresponding receiver 109, the sensing logic 114 obtains a difference signal by subtracting echoes corresponding to the consecutive transmission periods. For a static object, the echoes over consecutive transmission periods are almost identical and cancel out in the difference signal. A moving object on the other hand results in amplitude and phase differences in corresponding echoes over consecutive transmission periods, producing non-zero difference components. A power detector in the sensing logic 114 is then used to determine the time-of-flight, and hence the range, and the phase differences across the array elements of the receiver are used to extract angular information using a direction-of-arrival (DOA) beamformer. The parameter PRI may be chosen so that the sensor may process echoes from the farthest object that is of interest within its range.

If the active transmissions are uncoordinated in time, then echoes received at a sensor 102 from transmission from another sensor 102 might result in false alarms. There are at least two possible options to coordinate these active transmissions. One is to accurately time-synchronize all sensor transmissions, which is extremely challenging and expensive in practice. The second is to time multiplex active transmissions and assign transmission slots to sensors 102 such that sensors within listening range have unique transmission slots. Considering this latter option, two problems may need to be addressed. One is how to allocate the transmission slots so that one transmission does not result in echoes over a transmission slot of another sensor within listening range. The second is to ensure that each sensor 102 maintains its transmission slot, given that each sensor may exhibit clock drifts. That is, the timing of the time slots and frames from the perspective of each sensor 102 is based on the respective clock 107 of that individual sensor 102; but as mentioned, each clock 107 may have a different respective clock error, leading to a potential discrepancy between the timing of the different sensors.

In the following embodiments, there is provided a solution to these problems that is distributed and does not require a central coordinator, wherein the sensors 102 do not have any mechanism to establish identifiers and there is no explicit messaging.

In the following exemplary solution, each ultrasonic array sensor 102 processes the echoes at its receiver array corresponding to transmission over at least one slot and constructs a synchronization vector with elements being the absolute amplitude of the received echo signal averaged over a range-bin. Pre-synchronization is achieved by estimating the time drift by correlating the synchronization vectors over two different transmission slots, and by applying linear regression over different estimated drifts. Upon pre-synchronization, each sensor 102 listens over multiple slots before picking up an empty slot for transmission. A cross-check may be performed to ensure that a slot occupied by a sensor 102 does not result in cross-interference at another sensor within listening range. Post-synchronization may then be used to ensure that the sensors maintain their allotted slots. Example processing steps performed by the timing logic 116 are described in more detail below.

In embodiments the timing logic is configured to listen for instances of the pulses from the other sensors to determine whether any of the other sensors are already transmitting on any of said time slots (and if so which time slot or slots). The timing logic then selects one of the time slots not already used by one of the other sensors, and uses the selected time slot in subsequent frames to transmit the pulses from the respective transmitter. The listening may be performed for an initial period of at least one frame before beginning transmission of the pulses from the respective transmitter. In embodiments, the initial period may comprise one frame extended by a random time.

Figure 4:
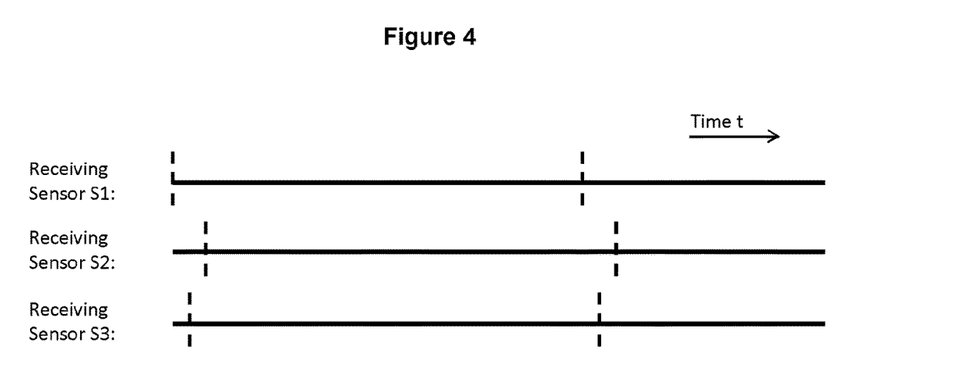
FIG. 4 is a schematic timing diagram illustrating an initial listening window of a plurality of presence sensors.
Figure 5:
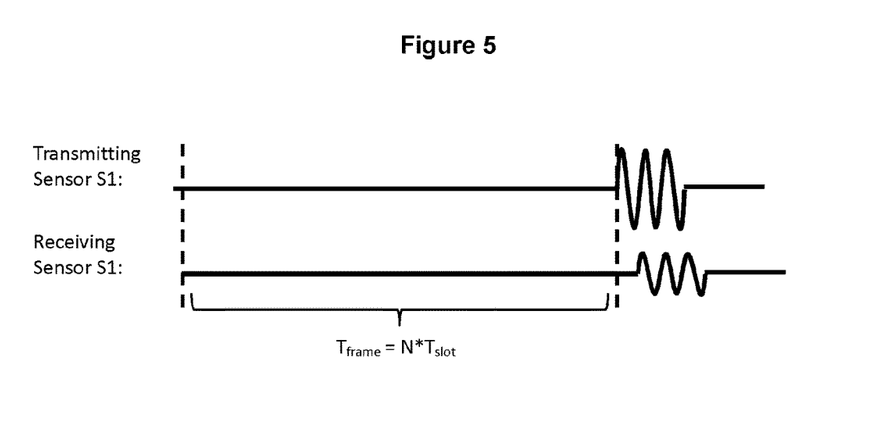
FIG. 5 is a schematic timing diagram illustrating a first one of the sensors beginning transmission.

For example referring to FIGS. 4 and 5, during an initial phase, each sensor 102 starts in a listening mode and so no transmission is expected to be present. Hence, each sensor 102 listens to verify that there is no other transmission, during which time it is silent. A typical listening window at this stage is depicted in FIG. 4. The window will preferably be at least one frame long to ensure no other sensors 102 are already transmitting on any of the time slots (or if they are, that these are detected). Note that the starting time of each listening window is different for each sensor 102, either because they are turned on at different times and/or because their clocks 107 are not exactly the same. If there is no other transmission detected in the initial frame, then a sensor 102 begins transmission after a random time Ti. Because of the random offset, the time waited will therefore be different for each sensor 102, preventing all sensors from starting transmission at once. This may not be required if each sensor 102 is simply turned on at a different time, e.g. which may occur without any particular coordination if they happen to be installed at different times. However the random time may help ensure no two sensors begin at once. In the example shown in FIG. 5, sensor S1 begins transmission and repeats the transmission every subsequent frame with a period of $T_{frame}=2N \cdot PRI$, or more generally $N \cdot T_{slot}$.

Note that for illustrative purposes, in FIGS. 5 to 10 only one pulse is shown from a given sensor 102 in each fame. However, it will be appreciated that in embodiments this may represent one or more pulses within the respective time slot, e.g. two separated by an interval PRI as in FIG. 3.

Figure 6:
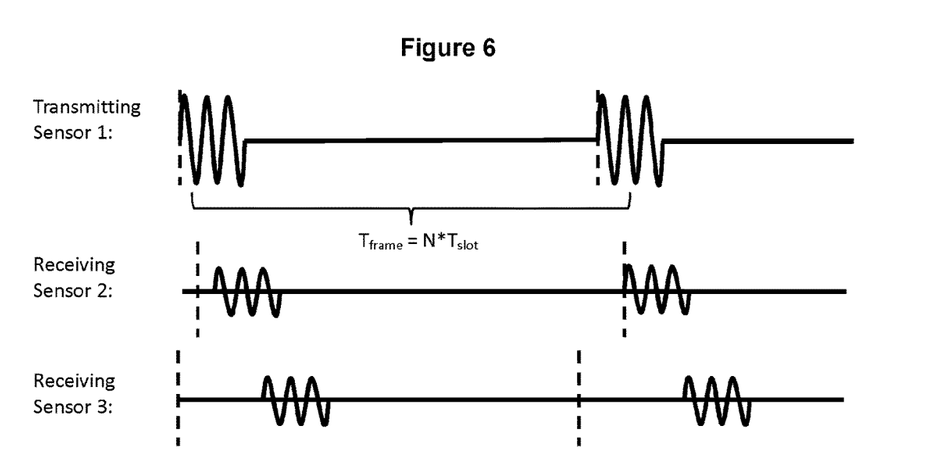
FIG. 6 is a schematic timing diagram illustrating a listening phase of others of the sensors.
Figure 7:
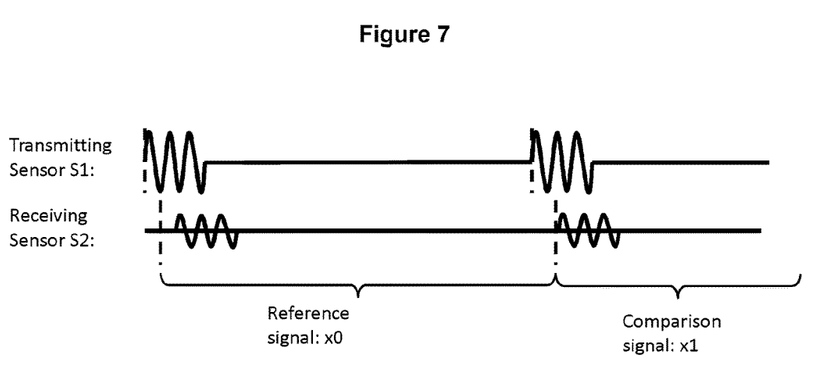
FIG. 7 is a schematic timing diagram illustrating reference waveforms for use in computing a clock drift.
Figure 8:
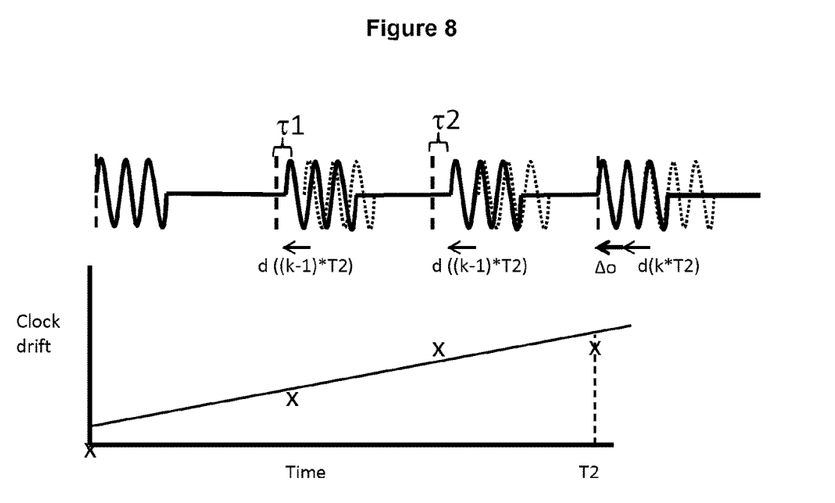
FIG. 8 is a schematic illustration of compensating for a plurality of clock drifts over time.

Referring to FIGS. 6 to 8, once one of the sensors 102 (e.g. S1 in the illustrated example) has begun transmitting, then all the other sensors 102 at listening range will detect this and begin synchronization with respect to the transmitting sensor S1. The received signal in a priorly determined (e.g., first) frame of 2N·PRI may be considered the reference. This is illustrated in FIG. 6.

In embodiments, the timing logic is configured to determine a timing value which maximizes a measure of similarity between a representation of a waveform from one of said frames and a representation of a waveform from another of said frames with one of the representations shifted in time by the timing value (each waveform comprising one or more of the pulses received from one or more of the other sensors). That is, the lag at which the correlation between power signals from the two frames is maximized. The adjustment to compensate for the clock discrepancy can then be based on this timing value. For example, the compensation may be based on a measure of correlation between the waveforms of one frame and another, e.g. two adjacent frames.

For example referring to FIG. 7, each listening sensor estimates a clock drift, τ, in the following way.

$$\tau = \underset{\tau}{\operatorname{argmax}} \int |x0(t)|^2 |x1(t+\tau)|^2 dt$$

where x1 is a comparison signal from a present frame and x0 is a reference signal from the preceding frame.

In a digital implementation this integral may be implemented as a cross-correlation between synchronization vectors v0 and v1, representing each of the reference signal and comparison signal in terms of a set of discrete components. Other measures of similarity between waveforms are also possible (or equivalently measures of dissimilarity which may be minimized).

In embodiments, the timing logic is configured to accumulate such a measure over more than two frames and make the adjustment based on the accumulation. For example, as illustrated in FIG. 8, the sensor 102 builds a history of the clock drift for a time duration 'T2' and then calculates a drift compensation (Δd compensated every frame) and offset compensation (Δo compensated once at end of time T2). The total drift compensation d(k·T2) is updated every 'T2':

$$d(k \cdot T2) = d((k-1)*T2) - \Delta d$$

In embodiments (assuming it is not the first to transmit) the timing logic of a sensor is configured to first compensate for the clock discrepancy before then beginning to transmit on a selected time slot on condition that a threshold accuracy has been obtained for the clock compensation. For example, the above procedure may be repeated for several lots of time 'T2' until a sensor is synchronized with enough accuracy to the transmitting sensor ($\Delta d<\epsilon$). When the sensor 102 is accurately enough synchronized, then the sensor finds an empty timeslot of duration Tslot and begins to transmit.

Figure 9:
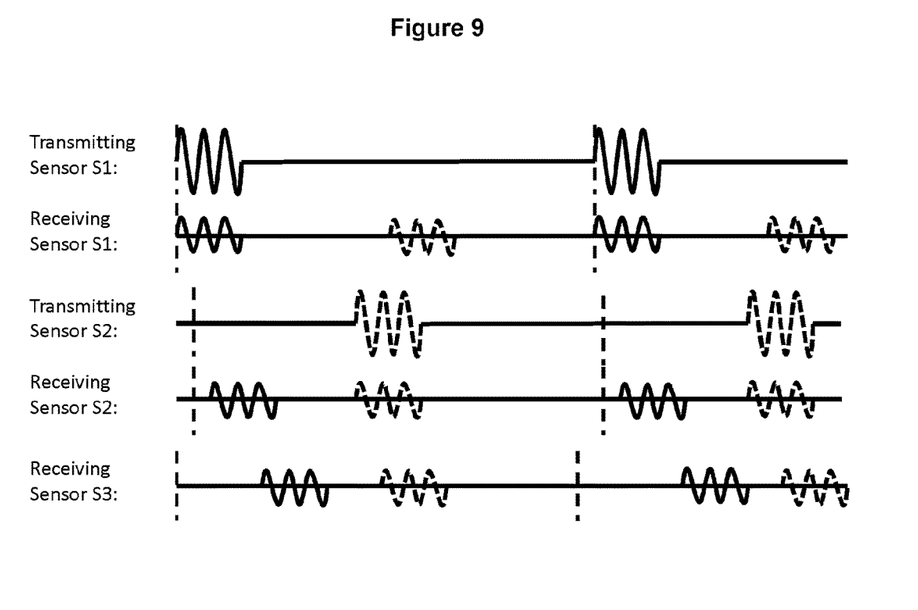
FIG. 9 is a schematic timing diagram illustrating a second sensor beginning transmission after synchronizing with transmission of a first sensor.

In the example of FIG. 9, sensor S2 begins transmitting after synchronizing with the transmission of sensor S1.

When a new sensor 102 begins to transmit, all the other sensors 102 in listening range include it for synchronization. Note that in embodiments, in the case of a transmitting sensor 102 the reference signal for synchronizing that sensor does not include its own transmission.

Figure 10:
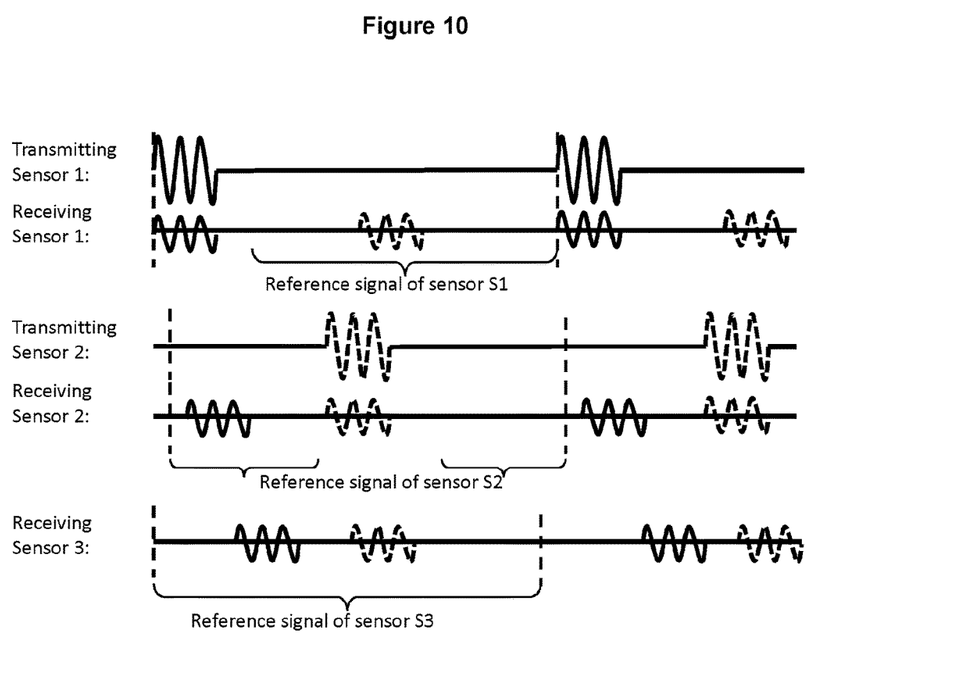
FIG. 10 is a schematic timing diagram illustrating reference waveforms for use in synchronizing a third sensor.

In FIG. 10, the reference signals for sensors S1, S2 and S3 are shown. Here the reference for sensor S3 includes all the timeslots, whereas in the case of sensor S1 and S2 it does not.

An already synchronized sensor 102 may update its estimated clock compensation drift, d, and offset compensation, $\Delta o$, every 'T2' by using the sensor new reference signal (excluding its own transmission) and the procedures as illustrated in FIG. 7 and FIG. 8. This synchronization may be performed continuously as long as the sensor is transmitting. In other embodiments the clock synchronization need only be performed relatively infrequently compared to the frame length, e.g. readjusting the clock only once every few minutes, hours or even days.

To summarize, in embodiments the timing logic 116 in each sensor 102 may be configured to obey the following same set of rules:
(i) after turning on, listen for at least one frame (and do not transmit), optionally modulated by an extra random time;
(ii) if no sensing pulses from other sensors 102 are found in that time, select any time slot and begin transmitting on that time slot;
(iii) if sensing pulses from one or more other sensors sensor 102 are found on one or more of the time slots, synchronize the sensor's own clock 107 to the sensing pulses received form these one or more other sensors and then, once sufficiently synchronized, select an unclaimed time slot and begin transmitting on that slot;
(iv) optionally, once transmitting, continue to listen for sensing pulses from other sensors 102 and repeat the clock synchronization (either continually or at intervals) to remain synchronized.

If a plurality of like sensors 102 are located together in the vicinity of one another, each configured to follow these rules, then it may be ensured that they transmit their pulses in a synchronized manner (i.e. avoiding one another's time slots) even though no explicit central coordination is provided.

An optional further aspect of the present invention relates to the deployment of a system of multimodal sensors, e.g. for presence detection. A multimodal sensor has two or more different sensing modes, e.g. ultrasonic sensing and passive infrared (PIR) sensing. Adjacent sensors can perform PIR sensing (or other passive sensing) simultaneously without any cross interference. But adjacent sensors are likely to cause cross interference by simultaneously performing ultrasonic sensing (or other active sensing) at the same frequency.

Advantageously, one sensing mode may be more accurate than another, and/or using two or more sensing modes together may be more accurate still (or have other advantages due to sensor fusion). Further embodiments of the invention are concerned with optimizing performance in a system of multimodal sensors.

Such embodiments employ at least one sensor 102 which has two or more different sensing modes, at least one of which is an active sensing mode. The sensor 102 selects which one or more of its sensing modes to use at a given moment, based on which mode(s) is/are in use by its neighboring sensor(s) 102 at the same moment. Thus the sensor 102 can avoid simultaneously using the same active sensing mode as its neighbor(s), thereby avoiding or at least mitigating cross interference.

For instance, a sensor 102 may select to use ultrasonic sensing and PIR sensing simultaneously when its neighboring sensor(s) 102 is/are not using ultrasonic sensing, and to use only PIR sensing at all other times.

Embodiments of the present invention therefore provide a method of dynamically switching between sensing modes so that each sensor 102 in the system gets its 'fair share' of one or more active sensing modes. This comprises a first sensor relinquishing an active sensing mode after a given period of time, its slot being taken by a second sensor which at that time had not been using the active sensing mode.

Advantageously, in embodiments this dynamic optimization of a multimode sensor system may again be provided without the need for a central controller or explicit communication between the sensors.

It will be appreciated that the above embodiments have been described only by way of example.

For instance while the above has been described for use in a lighting system, e.g. for active presence sensing systems in different indoor and/or outdoor lighting, the invention is not limited to lighting systems and can find applications in other areas such as other building control applications. Further, the invention is not limited to ultrasonic sensing, and other options include active sensing based on radio frequencies, microwave or other forms of radiation. Further, the invention is not limited to any particular algorithm for sensing presence, or to sensing any particular aspect of presence such as motion. Further, although the above has been described in terms of a completely distributed system with no centralized controller or other coordinator, it is not excluded that the present invention could be applied in conjunction with some amount coordination from a central element so that the two techniques may supplement each other. The invention may be applied in any scenario where it may be desirable to control the transmission of pulses from one sensor in relation to one or more other sensors, whether to mitigate any interference or other undesired effect that may occur between sensors, or to obtain any desired effect that may be achieved through their synchronized operation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or

The invention claimed is:

1. Apparatus for use in one of a plurality of sensors each having a respective transmitter which transmits pulses for sensing, a respective clock which controls timing of the pulses transmitted from the respective transmitter, and a respective receiver which receives echoed instances of said pulses; the apparatus comprising:
sensing logic configured to sense a being or object in dependence on the echoed pulses received back by the respective receiver from the respective transmitter; and
timing logic configured to compensate for a clock discrepancy between the respective clock and that of one or more others of the sensors, by using the respective receiver to listen for instances of the pulses from the one or more other sensors, and adjusting the timing of the pulses from the respective transmitter based thereon.

2. The apparatus of claim 1, wherein each of the sensors is to transmit on a different respective time slot over a plurality of frames, so that when transmitting each of the transmitters transmits one or more of the pulses on its respective time slot per frame.

3. The apparatus of claim 2, wherein the timing logic is configured to determine a timing value which maximizes a measure of similarity between a representation of a waveform from one of said frames and a representation of a waveform from another of said frames with one of the representations shifted in time by the timing value, each waveform comprising one or more of the pulses received from one or more of the other sensors; and wherein said adjustment is based on said timing value.

4. The apparatus of claim 3, wherein the timing logic is configured to accumulate said timing value over more than two frames and make said adjustment based on the accumulation of said timing value.

5. The apparatus of claim 3, wherein said timing value is determined as a lag at which a correlation between power signals is maximized, according to:

$$\tau = \underset{\tau}{\operatorname{argmax}} \int |x0(t)|^2 |x1(t+\tau)|^2 dt$$

where $\tau$ is the timing value, x1 is one of said waveforms, and x0 is one of the waveforms from a preceding frame.

6. The apparatus of claim 2, wherein the timing logic is configured to listen for instances of the pulses from the other sensors to determine whether any of the other sensors are already transmitting on any of said time slots, to select one of the time slots not already used by one of the other sensors, and to use the selected time slot in subsequent frames to transmit the pulses from the respective transmitter.

7. The apparatus of claim 6, wherein the timing logic is configured to first compensate for the clock discrepancy and then, on condition that a threshold accuracy has been obtained for said compensation, to begin and using the selected time slot in subsequent frames to transmit the pulses from the respective transmitter.

8. The apparatus of claim 7, wherein the timing logic is configured to perform said listening for an initial period of at least one of said frames before beginning transmission of the pulses from the respective transmitter.

9. The apparatus of claim 3, wherein the initial period comprises one of said frames extended by a random time.

10. The apparatus of claim 1, wherein said one of the sensors is a multimode sensor operable in an active mode based on said pulses from the respective transmitter and in a passive mode which does not transmit pulses; and
the timing logic is configured to listen for instances of the pulses from the other sensors to determine whether a neighboring sensor is operating in an active mode, and to avoid operating said one of the sensors in the active mode at a same time as a neighboring sensor is in an active mode.

11. The apparatus of claim 1, wherein the timing logic is configured to operate without a dedicated timing signal being communicated between the sensors or from a central controller, by instead performing said listening for instances of the pulses from the one or more other sensors.

12. A sensor comprising the apparatus of claim 1 and the respective transmitter, clock and receiver.

13. A system comprising a plurality of said sensors each comprising an instance of the apparatus according to claim 1.

14. A computer program product for operating one of a plurality of sensors each having a respective transmitter which transmits pulses for sensing, a respective clock which controls timing of the pulses transmitted from the respective transmitter, and a respective receiver which receives echoed instances of said pulses; the computer program product comprising code embodied on a non-transitory computer-readable storage medium and configured so as when executed on a processing apparatus of said one of the sensors to perform operations of:
sensing a being or object in dependence on the echoed pulses received back by the respective receiver from the respective transmitter; and
compensating for a clock discrepancy between the respective clock and that of one or more others of the sensors, by using the respective receiver to listen for instances of the pulses from the one or more other sensors, and adjusting the timing of the pulses from the respective transmitter based thereon.

15. Apparatus for use in one of a plurality of ultrasonic sensors each comprising a respective ultrasound transmitter which transmits ultrasound pulses for sensing and a respective ultrasound receiver which receives echoed instances of said ultrasound pulses, the apparatus comprising:
sensing logic configured to sense a being or object in dependence on the echoed ultrasound pulses received back by the respective receiver from the respective transmitter; and
synchronization logic configured to synchronize the ultrasound pulses transmitted from the respective transmitter relative to transmission of the ultrasound pulses from one or more others of said ultrasound sensors, by using the respective receiver to listen for instances of the ultrasound pulses from the other ultrasound sensors and performing the synchronization based thereon.

* * * * *